(12) United States Patent
Lapis

(10) Patent No.: US 11,505,245 B2
(45) Date of Patent: Nov. 22, 2022

(54) STEER-BY-WIRE STEERING SYSTEM WITH TORQUE VECTORING AND INTEGRATED ANTI-SLIP CONTROL

(71) Applicants: THYSSENKRUPP PRESTA AG, Eschen (LI); thyssenkrupp AG, Essen (DE)

(72) Inventor: Leonard Lapis, Sennwald (CH)

(73) Assignees: thyssenkrupp Presta AG, Eschen (LI); thyssenkrupg AG, Essen (DE)

( * ) Notice: Subject to any disclaimer, the term of this patent is extended or adjusted under 35 U.S.C. 154(b) by 451 days.

(21) Appl. No.: 16/620,959

(22) PCT Filed: Jun. 26, 2018

(86) PCT No.: PCT/EP2018/067105
§ 371 (c)(1),
(2) Date: Dec. 10, 2019

(87) PCT Pub. No.: WO2019/002288
PCT Pub. Date: Jan. 3, 2019

(65) Prior Publication Data
US 2020/0108866 A1    Apr. 9, 2020

(30) Foreign Application Priority Data
Jun. 29, 2017 (DE) .................. 10 2017 114 494.3

(51) Int. Cl.
*B62D 6/00*     (2006.01)
*B62D 11/10*    (2006.01)
*B62D 5/00*     (2006.01)

(52) U.S. Cl.
CPC .............. *B62D 11/10* (2013.01); *B62D 5/006* (2013.01)

(58) Field of Classification Search
CPC ........ B62D 11/10; B62D 5/006; B62D 9/002; B62D 6/00; Y02T 10/64; Y02T 10/72; B60L 15/2036

(Continued)

(56) References Cited

U.S. PATENT DOCUMENTS

| | | |
|---|---|---|
| 5,947,855 A | 9/1999 | Weiss |
| 6,038,500 A | 3/2000 | Weiss |

(Continued)

FOREIGN PATENT DOCUMENTS

| | | |
|---|---|---|
| CN | 1530271 A | 9/2004 |
| CN | 1651294 A | 8/2005 |

(Continued)

OTHER PUBLICATIONS

English Translation of International Search Report issued in PCT/EP2018/067105, dated Oct. 29, 2018 (mailed Nov. 7, 2018).

(Continued)

Primary Examiner — Shardul D Patel
(74) *Attorney, Agent, or Firm* — thyssenkrupp North America, LLC

(57) ABSTRACT

A steer-by-wire steering system for a motor vehicle with a steerable front wheel axle that has two steerable wheels. The front wheel axle includes a single wheel drive which, by means of a drive controller, individually drives wheel drives which are associated with the steerable wheels. The drive controller has a controller which determines a target speed for the left-hand wheel and a target speed for the right-hand wheel in accordance with an accelerator pedal angle and a rotational angle of a steering shaft, and which limits the target speeds to a slip-limited speed. The drive controller individually drives the wheel drives in such a way that the difference between the target speed and the actual speed for each steerable wheel is minimal.

8 Claims, 2 Drawing Sheets

(58) Field of Classification Search
USPC .......................................... 74/665 T; 701/41
See application file for complete search history.

(56) References Cited

U.S. PATENT DOCUMENTS

| | | | |
|---|---|---|---|
| 7,548,806 B2* | 6/2009 | Yasutake | B60W 10/04 |
| | | | 701/72 |
| 2004/0149498 A1* | 8/2004 | Nakashima | B66F 9/07572 |
| | | | 180/6.24 |
| 2004/0200648 A1 | 10/2004 | Tarasinski | |
| 2006/0074530 A1* | 4/2006 | Meyers | B60W 10/119 |
| | | | 701/1 |
| 2007/0184929 A1* | 8/2007 | Piyabongkarn | F16H 48/34 |
| | | | 475/84 |
| 2009/0091435 A1* | 4/2009 | Bolourchi | B60K 28/066 |
| | | | 340/575 |
| 2012/0053806 A1 | 3/2012 | Troennberg et al. | |
| 2012/0316733 A1* | 12/2012 | Futamura | B60T 8/1755 |
| | | | 701/42 |
| 2014/0156127 A1* | 6/2014 | Ebert | B60L 3/0084 |
| | | | 701/22 |
| 2015/0343860 A1 | 12/2015 | Lee | |
| 2019/0152513 A1* | 5/2019 | Awan | B62D 9/005 |
| 2020/0339099 A1* | 10/2020 | Lapis | B60W 30/04 |

FOREIGN PATENT DOCUMENTS

| | | |
|---|---|---|
| CN | 101633316 A | 1/2010 |
| CN | 101758854 A | 6/2010 |
| CN | 102501779 A | 6/2012 |
| CN | 102822022 A | 12/2012 |
| CN | 103781650 A | 5/2014 |
| CN | 106080770 A | 11/2016 |
| DE | 196 23 738 A | 12/1997 |
| DE | 197 10 082 A | 10/1998 |
| DE | 103 16 862 A | 10/2004 |
| DE | 102005048321 A | 4/2007 |
| DE | 102008049992 A | 4/2010 |
| DE | 10 2013 011 883 A | 1/2015 |
| DE | 102014223691 A | 12/2015 |
| EP | 1393951 A2 | 3/2004 |
| EP | 1916142 A2 | 4/2008 |
| EP | 2 611 661 B | 7/2013 |
| JP | 2002030952 A | 1/2002 |
| JP | 2008-087500 A | 4/2008 |
| JP | 2009-06188 A | 3/2009 |
| JP | 2009-061888 A | 3/2009 |
| WO | 2006/054069 A1 | 5/2006 |
| WO | 2015/007418 A | 1/2015 |

OTHER PUBLICATIONS

Xin, Chen, et al. "SDRE-Research on SBW System's Control Method based on SDRE Technique"; China Mechanical Engineering, No. 12, pp. 1496-1501, English Abstract (2012).

* cited by examiner

STEER-BY-WIRE STEERING SYSTEM WITH TORQUE VECTORING AND INTEGRATED ANTI-SLIP CONTROL

CROSS REFERENCE TO RELATED APPLICATIONS

This application is a U.S. National Stage Entry of International Patent Application Serial Number PCT/EP2018/067105, filed Jun. 26, 2018, which claims priority to German Patent Application No. DE 10 2017 114 494.3, filed Jun. 29, 2017, the entire contents of both of which are incorporated herein by reference.

FIELD

The present disclosure generally relates to a steer-by-wire steering system of a motor vehicle.

BACKGROUND

In steer-by-wire steering systems, the position of the steered wheels is not connected directly to the steering input means, for example a steering wheel. There is a connection between the steering wheel and the steered wheels by means of electrical signals. The driver's steering request is tapped by a steering angle sensor and the position of the steered wheels is controlled in accordance with the driver's steering request by means of a steering actuator.

In order to avoid unstable driving situations such as oversteering or under-steering, so-called "torque vectoring" is known in which a drive torque is distributed between a left-hand vehicle wheel and a right-hand vehicle wheel by means of a specially designed differential gear, in order in this way to counteract the understeering or oversteering. Therefore, if a wheel is braked in an unstable driving situation while the drive force is being conducted to the wheel which has the greatest reduction in yawing moment, that is to say if understeering occurs, the control system applies more drive force to the wheel on the outside of the bend via a separate clutch, so that the vehicle is "pushed" into the bend. Undesired slipping of the vehicle wheels may occur during travel. Longitudinal slip arises owing to the spinning or locking of the vehicle wheels and has a direct effect on the wear of the tires. The term "slip" is understood to mean the state when during acceleration or braking of the vehicle the wheel circumferential speed differs from the speed of the vehicle.

DE 10 2013 011 883 A1 discloses a method in which a target steering angle is calculated by means of a steering wheel rotational angle and an actual steering angle is made available by the vehicle wheels. The determination of the wheel drive torques for the left-hand wheel and right-hand wheel is carried out here in such a way that the difference between the target steering angle and the actual steering angle is made smaller. This solution proves disadvantageous because the spinning of the wheels is not taken into account.

Patent document EP 2 611 661 B1 discloses a torque vectoring method in which the torque control value of the two wheels results from the yaw rate of the vehicle, the steering angle and the longitudinal slip of the two wheels.

Thus a need exists for a steer-by-wire steering system of a motor vehicle with an individual wheel drive on the front axle in which slipping of the vehicle wheels can be prevented by means of torque vectoring. Furthermore, a method for avoiding slip by means of torque vectoring is to be disclosed.

DETAILED DESCRIPTION

Figure 1:
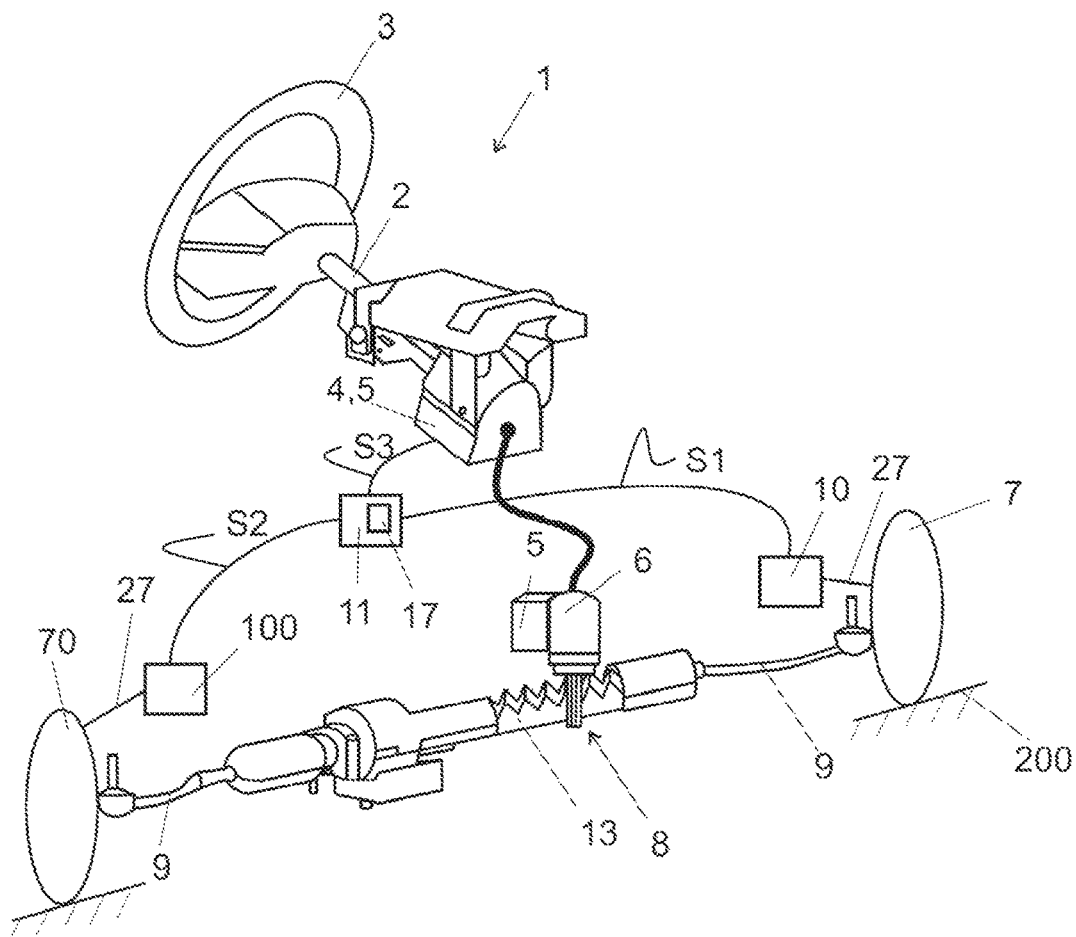
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a steer-by-wire steering system of a motor vehicle and a method for controlling a steer-by-wire steering system of a motor vehicle.

Accordingly, a steer-by-wire steering system for a motor vehicle with a steerable front wheel axle comprising two steerable wheels is provided, wherein the front wheel axle comprises a single wheel drive which, by means of a drive controller, individually drives wheel drives which are associated with the steerable wheels, wherein the drive controller comprises a controller which determines a target speed for a left-hand wheel of the steerable wheels and a target speed for a right-hand wheel of the steerable wheels in accordance with an accelerator pedal angle and a rotational angle of a steering shaft, and which limits said target speeds to a slip-limited speed, wherein the drive controller individually drives the wheel drives in such a way that the difference between the target speed and the actual speed for each steerable wheel is minimal. The front wheels are therefore prevented from spinning, and the vehicle is not accelerated only by steering. A reduction in the slip is improved, during which reduction the loss of traction and lateral guidance can be limited. At the same time, the driving dynamics and the driving safety are increased.

The limitation to the slip-limited speed is preferably implemented by means of a predefined maximum permissible longitudinal slip and an average vehicle speed which is tapped at a rear axle of the motor vehicle.

The maximum permissible longitudinal slip advantageously lies in a range from 5% to 15% of the average vehicle speed which is tapped at the rear axle, and is preferably approximately 10%.

It is preferred that the wheel drives are electric motors.

Furthermore, a method for controlling a steer-by-wire steering system of a motor vehicle with a steerable front wheel axle comprising two steerable wheels is provided, wherein the front wheel axle comprises a single wheel drive which, by means of a drive controller, individually drives wheel drives which are associated with the steerable wheels, wherein the method comprises the following steps:

measuring an accelerator pedal angle, a rotational angle of a steering shaft and actual speeds of the steerable wheels, determining a target average speed of the front wheels by means of the accelerator pedal angle, determining a differential speed of the front wheels on the basis of the rotational angle of the steering shaft, determining a target speed for a left-hand wheel of the steerable wheels and a target speed for a right-hand wheel of the steerable wheels on the basis of the target average speed of the front wheels and the differential speed of the front wheels, limiting the target speed for the left-hand wheel of the steerable wheels and the target speed for the right-hand wheel of the steerable wheels to a slip-limited speed, determining a difference between the target speeds for the left-hand wheel of the steerable wheels and for the right-hand wheel of the steerable wheels and the actual speeds of the steerable wheels and calculating the drive torque for the steerable wheels in order to minimize the difference.

The drive torque for the individually driven front wheels is therefore set in such a way that the difference between the target speed and the actual speed of the front wheels is minimized, and as a result steers the vehicle within the predefined slip range at each accelerator pedal angle and each steering wheel angle.

The limitation to the slip-limited speed is preferably implemented by means of a predefined maximum permissible longitudinal slip and an average vehicle speed which is tapped at a rear axle.

In this context it is advantageous if the maximum permissible longitudinal slip lies in a range from 5% to 15% of the average vehicle speed which is tapped at the rear axle, and is preferably 10%.

The limitation of the target speeds to the average vehicle speed which is preferably tapped at the rear axle takes into account the maximum permissible longitudinal slip.

A steer-by-wire steering system 1 is shown in FIG. 1. A rotational angle sensor (not illustrated) is mounted on a steering shaft 2, which steering angle sensor senses the driver's steering angle which is applied by rotating a steering input means 3 which is embodied as a steering wheel in the example. However, it is additionally also possible to sense a steering torque. Furthermore, a feedback actuator 4 is mounted on the steering shaft 2, which feedback actuator 4 serves to simulate the reactions of a roadway 200 on the steering wheel 3 and therefore to provide the driver with feedback about the steering behavior and driving behavior of the vehicle. The driver's steering request is passed on to a steering control unit 5 by means of the rotational angle $\beta_{sw}$, measured by the steering angle sensor, of the steering wheel 2 via signal lines, said steering control unit 5 actuating, in accordance with further input variables, an electric steering actuator 6 which controls the position of the steerable wheels 7, 70, which can also be referred to as the steered wheels. The steering actuator 6 acts indirectly on the steered wheels 7, 70 via a steering-shaft steering gear mechanism 8, such as, for example, a steering-rack steering gear mechanism, as well as via track rods 9 and other components. Drive motors 10, 100 are associated with the steerable wheels 7, 70 and drive the steerable wheels 7, 70 separately in the form of a single wheel drive. A drive controller 11 is provided which receives, via a signal line S3, the rotational angle $\beta_{sw}$, measured by the steering angle sensor, of the steering shaft 2 and further signals and determines therefrom the drive torques for the steerable wheels 7, 70 and transfers them to the respective drive motor 10, 100 via signal lines S1, S2.

Figure 2:
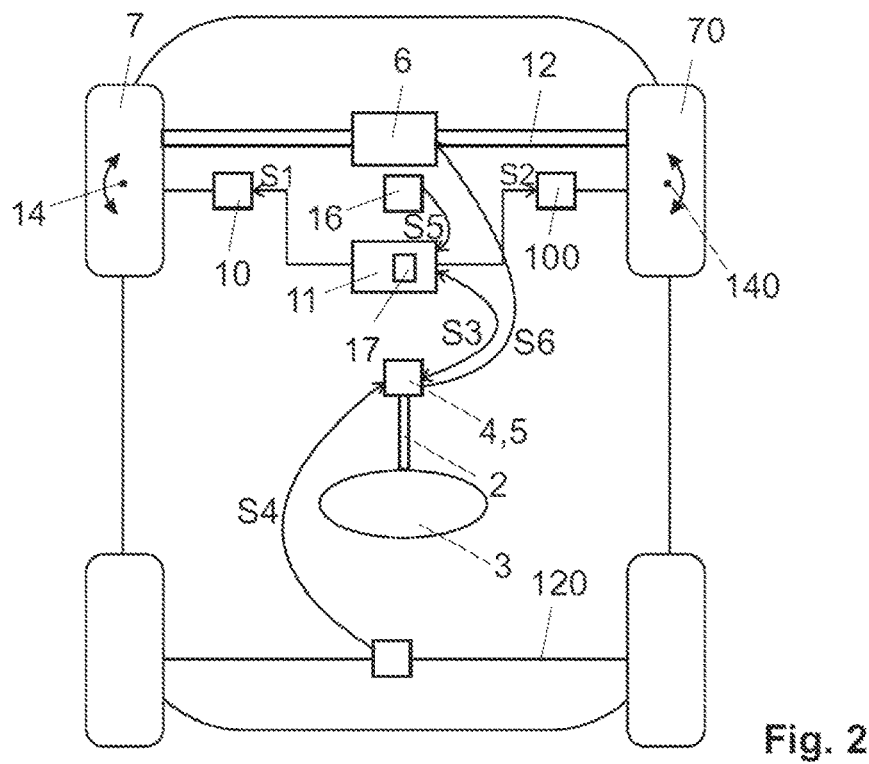
FIG. 2 is a schematic view of a steer-by-wire steering system with two separate wheel drives on the front axle.

FIG. 2 is a schematic illustration of the motor vehicle with the two axles, wherein the drive of the steerable wheels 7, 7 is arranged on a front axle 12. The front axle 12 comprises, with respect to a direction of travel, a left-hand steerable wheel 7 and a right-hand steerable wheel 70, which are connected to one another via the steering rack 13 of the steering-rack steering gear mechanism. When the steering rack 13 is moved transversely to the right or to the left with respect to the direction of travel, the wheels are pivoted about a respective pivoting point 14, 140. A left-hand drive motor 10 is arranged on the left in the direction of travel, and a right-hand drive motor 100 is arranged on the right in the direction of travel. The wheel drive motors 10, 100 are each connected to the steerable wheels 7, 70 via driveshafts 27. The wheel drive motors 10, 100 are preferably electric motors. The drive controller 11 actuates the left-hand drive motor 10 via a first signal line S1, and the right-hand drive motor 10, 100 via a second signal line S2. The drive controller 11 receives the rotational angle $\beta_{sw}$, measured by the rotational angle sensor, of the steering shaft 2 via a signal line S3 from the feedback actuator 4, which preferably comprises the steering control unit 5. The rotational angle $\beta_{sw}$ of the steering shaft 2 is additionally conducted to a rear axle 120 via a signal line S4. Furthermore, the position of the accelerator pedal 16 of the motor vehicle, preferably the accelerator pedal angle $\alpha_{ped}$, is transmitted to the drive controller 11 by means of a further signal line S5. Wheel angle sensors measure and transmit the current angle of the steered wheels and determine the average vehicle speed at the wheels of the rear axle $v_{FZ}$. Corresponding signal lines connect the sensors to the steering control unit 5 which passes on the average vehicle speed to the drive controller 11 via the signal line S6. FIG. 2 illustrates the straight-ahead position which coincides with the direction of travel. By activating the accelerator pedal 16, the driver can accelerate the motor vehicle. For this purpose, the drive controller 11 determines the necessary drive torque for the wheel drives 10.

Figure 3:
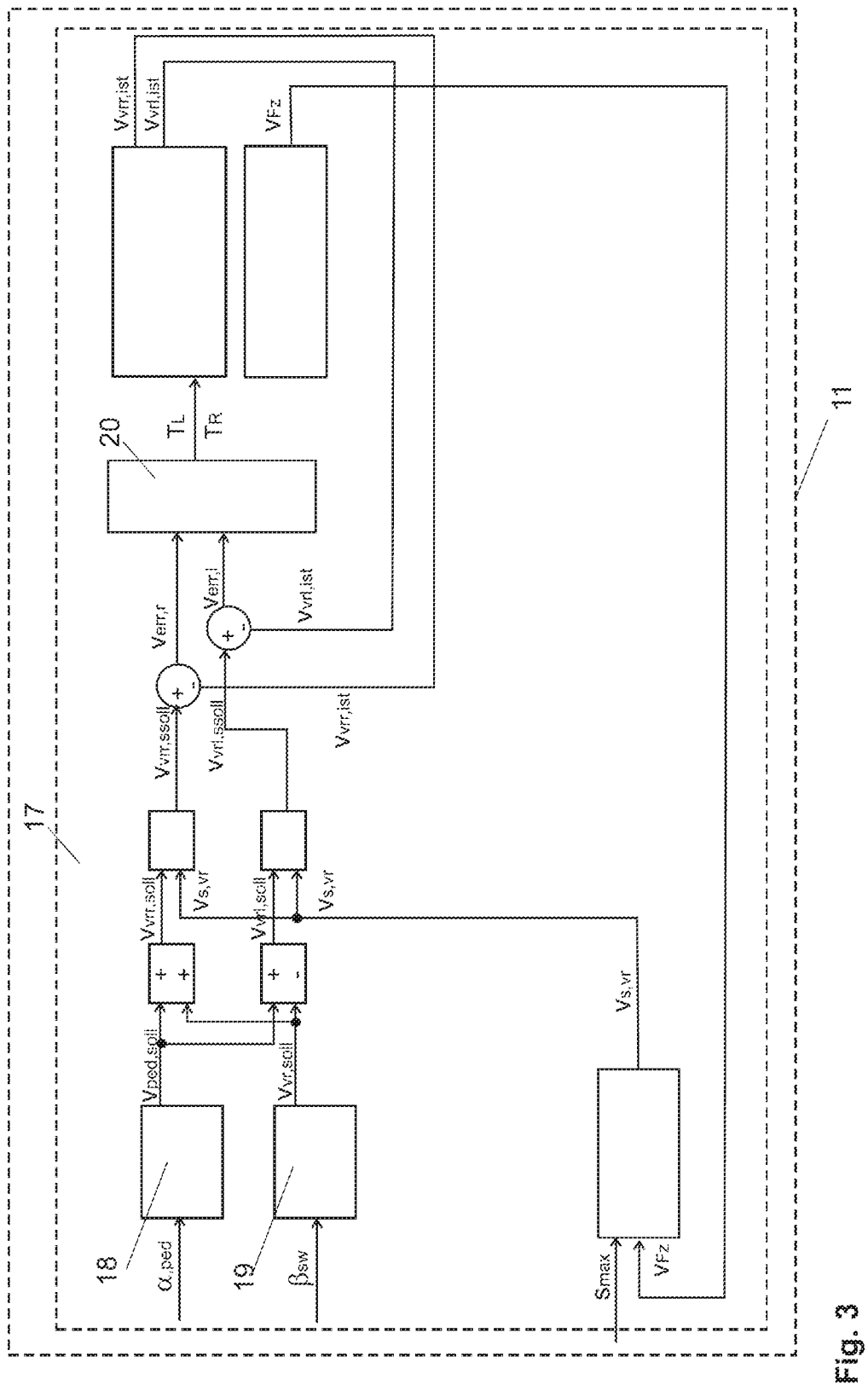
FIG. 3 is a block diagram of a controller of the steer-by-wire steering system with torque vectoring.

FIG. 3 shows the control of the steer-by-wire steering. The accelerator pedal angle $\alpha_{ped}$ which is applied by the driver via the pedal 16 and the rotational angle, measured by the rotational angle sensor, of the steering shaft 2, which can also be referred to as a steering wheel angle $\beta_{sw}$, are sent to the drive controller 11. The drive controller 11 has a controller 17 which determines the drive torques for the front wheels 7, 70. In a first section 18 of the controller 17, a target average speed of the front wheels $v_{ped,soll}$ is determined by means of the accelerator pedal angle $\alpha_{ped}$. In a second section 19, a differential speed of the front wheels $v_{vr,soll}$ is obtained on the basis of the steering wheel angle $\beta_{sw}$. The movement of the steering wheel to the left is defined as (−), and the movement to the right is defined as (+). If left-hand rotation occurs (−) and the accelerator pedal is activated (+), the right-hand wheel must be rotated more quickly than the left-hand wheel. If the accelerator pedal is activated (+) and the steering wheel is rotated to the right (+), the left-hand wheel must be rotated more quickly.

Correspondingly, a target speed results for the left-hand wheel $v_{vrl,soll}$ and a target speed results for the right-hand wheel $v_{vrr,soll}$. In a subsequent step, the target speeds are limited so that the slip can be limited or minimized. For this purpose, the vehicle speed $v_{Fz}$ is made available by means of the average speed of the rear wheels. The slip-limited front wheel speed $v_{s,vr}$ results from the vehicle speed $v_{FZ}$ and the maximum permitted longitudinal slip Is. The maximum permitted longitudinal slip Is lies in a range between 5% and 15% of the vehicle speed, and is preferably approximately 10%. The slip-limited front wheel speed $v_{s,vr}$ therefore results from $(v_{FZ} \times (1+Is/100))$. The target speed for the left-hand wheel $v_{vrl,soll}$ and the target speed for the right-hand wheel $v_{vrr,soll}$ are limited to the slip-limited speed $v_{s,vr}$, $(v_{vrr,ssol}, v_{vrl,ssoll})$. The actual speeds $v_{vrl,ist}$ and $v_{vrr,ist}$ which are measured at the front wheels are fed to the controller 20. A drive torque $T_L$, $T_R$ is calculated from the difference between the target and actual speeds $(v_{err,r}, v_{err,l})$ separately for the respective front wheel. The drive controller 11 passes on the drive torque $T_L$ to the left-hand drive motor 10 via the first signal line S1, and the drive torque $T_R$ to the right-hand drive motor 10 via the second signal line S2. The controller 17 determines the drive torque for the individual driven front wheels in such a way that the difference between the target and actual speeds of the front wheels is minimized, wherein it is ensured that the speed is always within the maximum permitted longitudinal slip.

What is claimed is:

1. A steer-by-wire steering system for a motor vehicle with a steerable front wheel axle comprising:
   a steering shaft,
   two steerable wheels comprising a left-hand wheel and a right-hand wheel,
   a single wheel drive that individually drives wheel drives which are associated with the steerable wheels, and
   a drive controller comprising a controller which determines a target speed for the left-hand wheel and a target speed for the right-hand wheel in accordance with an accelerator pedal angle and a rotational angle of the steering shaft, and which limits said target speeds to a slip-limited speed, wherein the drive controller individually drives the wheel drives such that the difference between the target speed and the actual speed for each steerable wheel is minimal.

2. The steer-by-wire steering system of claim 1 wherein the limitation to the slip-limited speed is implemented by a predefined maximum permissible longitudinal slip and an average vehicle speed which is tapped at a rear axle of the motor vehicle.

3. The steer-by-wire steering system of claim 2 wherein the maximum permissible longitudinal slip lies in a range from about 5% to about 15% of the average vehicle speed which is tapped at the rear axle.

4. The steer-by-wire steering system of claim 1 wherein the wheel drives include electric motors.

5. A method for controlling a steer-by-wire steering system of a motor vehicle with a steerable front wheel axle comprising two steerable wheels, wherein the front wheel axle comprises a single wheel drive which, via a drive controller, individually drives wheel drives which are associated with the steerable wheels, the method comprising:
   measuring an accelerator pedal angle, a rotational angle of a steering shaft and actual speeds of the steerable wheels,
   determining a target average speed of the front wheels by way of the accelerator pedal angle,
   determining a differential speed of the front wheels on the basis of the rotational angle of the steering shaft,
   determining a target speed for a left-hand wheel of the steerable wheels and a target speed for a right-hand wheel of the steerable wheels on the basis of the target average speed of the front wheels and the differential speed of the front wheels,
   limiting the target speed for the left-hand wheel of the steerable wheels and the target speed for the right-hand wheel of the steerable wheels to a slip-limited speed, and
   determining a difference between the target speeds for the left-hand wheel of the steerable wheels and for the right-hand wheel of the steerable wheels and the actual speeds of the steerable wheels and calculating drive torques for the steerable wheels in order to minimize the difference; and
   exerting the calculated drive torques at the steerable wheels.

6. The method of claim 5 wherein the limitation to the slip-limited speed is implemented by way of a pre-defined maximum permissible longitudinal slip and an average vehicle speed which is tapped at a rear axle.

7. The method of claim 6 wherein the maximum permissible longitudinal slip lies in a range from about 5% to about 15% of the average vehicle speed which is tapped at the rear axle.

8. The method of claim 5 wherein the limitation of the target speeds to the average vehicle speed which is tapped at the rear axle takes into account the maximum permissible longitudinal slip.

* * * * *

UNITED STATES PATENT AND TRADEMARK OFFICE
CERTIFICATE OF CORRECTION

Page 1 of 1

PATENT NO. : 11,505,245 B2
APPLICATION NO. : 16/620959
DATED : November 22, 2022
INVENTOR(S) : Leonard Lapis It is certified that error appears in the above-identified patent and that said Letters Patent is hereby corrected as shown below:

On the Title Page

In item (73) "Assignees", Please see below as to how it should appear:
(73) Assignees:
thyssenkrupp Presta AG, Eschen (LI);
thyssenkrupp AG, Essen (DE)

Signed and Sealed this
Twenty-eighth Day of February, 2023

Katherine Kelly Vidal
*Director of the United States Patent and Trademark Office*